US010637684B2

(12) United States Patent
Dong et al.

(10) Patent No.: US 10,637,684 B2
(45) Date of Patent: Apr. 28, 2020

(54) MESH NETWORK CONNECTIVITY

(71) Applicant: SIGNIFY HOLDING B.V., Eindhoven (NL)

(72) Inventors: Peiiliang Dong, Shanghai (CN); Zhizhong Zhang, Shanghai (CN); Bozena Erdmann, Aachen (DE); Armand Michel Marie Lelkens, Heerlen (NL); Ludovicus Marinus Gerardus Maria Tolhuozen, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/770,837

(22) PCT Filed: Oct. 12, 2016

(86) PCT No.: PCT/EP2016/074434
§ 371 (c)(1),
(2) Date: Apr. 25, 2018

(87) PCT Pub. No.: WO2017/071951
PCT Pub. Date: May 4, 2017

(65) Prior Publication Data
US 2018/0309593 A1    Oct. 25, 2018

(30) Foreign Application Priority Data

Oct. 27, 2015 (WO) ................ PCT/CN2015/000720
Dec. 14, 2015 (EP) ..................................... 15199842

(51) Int. Cl.
*H04L 12/46*     (2006.01)
*H04L 12/715*    (2013.01)
(Continued)

(52) U.S. Cl.
CPC .......... *H04L 12/4625* (2013.01); *H04L 45/04* (2013.01); *H04W 88/04* (2013.01); *H04W 84/18* (2013.01)

(58) Field of Classification Search
None
See application file for complete search history.

(56) References Cited

U.S. PATENT DOCUMENTS

| 8,838,761 B2 | 9/2014 | Jamieson et al. | |
| 2008/0137599 A1* | 6/2008 | Ham ................. | H04W 16/10 370/329 |

(Continued)

FOREIGN PATENT DOCUMENTS

WO    2013008136 A1    1/2013

OTHER PUBLICATIONS

Anonymous: "OneWireless Network with Cisco Aironet 1552S Access Point Overview", Mar. 1, 2012, pp. 1-6, XP055535328.
(Continued)

*Primary Examiner* — Kodzovi Acolatse
(74) *Attorney, Agent, or Firm* — Daniel J. Piotrowski

(57) ABSTRACT

The invention provides a mesh network bridging device adapted to allow a resource restricted device to pass and/or receive signals from a mesh network. The mesh network bridging device is operable over both a first communication channel, so as to communicate with the resource restricted device, and a second communication channel, so as to communicate with the mesh network. The mesh network bridging device is adapted to switch between a first and second mode of operation, associated with the first and second communication channel respectively, so as to alternately communicate with the resource restricted device and the mesh network bridging device. The mesh network bridg-
(Continued)

ing device may thereby act as a bridge between the resource restricted device and the mesh network bridging device.

16 Claims, 7 Drawing Sheets

(51) Int. Cl.
 *H04W 88/04* (2009.01)
 *H04W 84/18* (2009.01)

(56) References Cited

U.S. PATENT DOCUMENTS

| | | |
|---|---|---|
| 2012/0224571 A1 | 9/2012 | Yuan et al. |
| 2013/0242840 A1* | 9/2013 | Tolhuizen ......... H04W 52/0229 370/311 |
| 2014/0105066 A1 | 4/2014 | Erdmann et al. |
| 2014/0115132 A1* | 4/2014 | Erdmann ............ H04W 24/02 709/222 |
| 2015/0006758 A1* | 1/2015 | Holtman ............ H04L 45/127 709/244 |
| 2016/0014818 A1* | 1/2016 | Reitsma ............ H04W 76/50 370/254 |

OTHER PUBLICATIONS

Amtel AT02845: Coexistence between ZigBee and Other 2.4GHz Products, pp. 1-12.
Strixsystems Without Wires, Access/One Network, "Solving the Wireless Mesh Multi-Hop Dilemma", pp. 1-14.
"IEEE 802.15.4—Wikipedia, the free encyclopedia", Sep. 21, 2015 (Sep. 21, 2015), pp. 1-6, XP055324477, Retrieved from the Internet:URL:https://web.archive.org/web/20150921103942/https://en.wikipedia.org/wiki/IEEE_802.15.4[retrieved on Nov. 30, 2016] the whole document.
Anonymous: White Paper: Solving the Wireless Mesh Multi-Hop Dilemma; Nov. 24, 2005, pp. 1-14; XP055324432.

* cited by examiner

MESH NETWORK CONNECTIVITY

CROSS-REFERENCE TO PRIOR APPLICATIONS

This application is the U.S. National Phase application under 35 U.S.C. § 371 of International Application No. PCT/EP2016/074434, filed on Oct. 12, 2016 which claims the benefit of Chinese Patent Application No. PCT/CN2015/000720, filed on Oct. 27, 2015 and European Patent Application No. 15199842.4, filed Dec. 14, 2015. These applications are hereby incorporated by reference herein.

FIELD OF THE INVENTION

This invention relates to the field of mesh networks and in particular to mesh networks having at least one connectable resource restricted device.

BACKGROUND OF THE INVENTION

There has been an increasing trend in the use of mesh networks in home automation systems, building/industrial automation systems, infrastructure monitoring, secured military applications and other peer-to-peer connectivity systems.

A mesh network is typically understood to be an interconnected set of nodes, wherein each node contributes to the provision of information and/or signals across all other nodes. In other words, there may be more than one communication path between an arbitrary pair of nodes in the mesh network. This allows a mesh network to have a degree of redundancy, such that, for example, if a single node becomes inactive, the remaining nodes may still communicate with one another.

Typically, each node in a mesh network operates on the same communication channel, so as to permit ease of communication between all nodes of the mesh network. A node may comprise, for example, a wireless-connectable device capable of operating on a given wireless communication channel. Examples of such nodes may comprise a ZigBee® router or a BlueTooth-enabled relay.

US2012/224571 A1 (Yuan Wei [NL] et al) 6 Sep. 2012 describes a proxy device which is adapted to route packets from a resource restricted device to a mesh network. In an embodiment, the packets are translated into a different packet format by the proxy device.

US2014/105066 A1 (Erdmann Bozena [DE] et al) 17 Apr. 2014 appears to describe a process in which a network configuration parameter of a limited node (of a network) is updated to match an update to the network configuration parameter of a plurality of nodes in the network.

SUMMARY OF THE INVENTION

The invention is defined by the claims.

According to a first aspect of the inventive concept there is provided a mesh network bridging device for connecting a resource restricted device to a mesh network, the resource restricted device communicating in a communication channel having a first channel property and the mesh network communicating in a communication channel having a second channel property, the mesh network bridging device being adapted to have: a first mode of operation, wherein the mesh network bridging device communicates with the resource restricted device along the first communication channel having the first channel property; and a second mode of operation, wherein the mesh network bridging device communicates with the mesh network along the second communication channel having the second channel property, wherein the mesh network bridging device is adapted to determine if the first channel property of the first communication channel is different to the second channel property of the second communication channel; and in response to the first channel property being different to the second channel property, switch between the first mode of operation and the second mode of operation thereby allowing the resource restricted device to connect to the mesh network via the mesh network bridging device.

In other words, there is provided a bridging device (for a mesh network) which is adapted to allow connection of a resource restricted device operable on a first communication channel to the mesh network operable on a second communication channel. The second communication channel typically matches a communication channel in which the mesh network operates so as to allow the mesh network bridging device to act as a particular node of the mesh network.

A resource restricted device connectable to the mesh network bridging device may, for example, not have the ability to communicate on a particular channel (e.g. the second communication channel) due to, for example, an inability to match a predetermined periodicity of signal emission (due to a lack of power) or a lack of processing power that may be required to encode a signal or emit a signal on a particular frequency, and/or hardware/software restrictions, and/or limitations of its commissioning process. In some scenarios, the resource restricted device connectable to the mesh network bridging device may not be able to follow channel changes by the network. For example, it may not have suitable reception capability or enough energy to receive the channel update frame or has simply missed the channel update frame.

Thus the mesh network device may act as a bridge or a proxy for the resource restricted device so as to enable the resource restricted device to pass and receive signals from the mesh network.

Use of a resource restricted device may advantageously reduce the amount of power required to generate a signal for provision to a node of the mesh network. Furthermore, the required hardware or software footprint is minimized, due to the lightweight protocol for such a resource restricted device. Resource restricted devices may also provide a long device operation without the need for battery exchange, and may thereby be advantageously used in locations having difficult or inconvenient access (e.g. inside air ducts; positioned on roofs or other external locations and so on).

Communicating with the resource restricted device should be understood to mean either receiving data from the resource restricted device or transmitting data to the resource restricted device or both. Similarly, communicating with the mesh network should be understood to mean either receiving data from at least one device of the mesh network or transmitting data to at least one device of mesh network or both.

A communication channel may be either a physical connection (e.g. a wire), an optical channel, or preferably a wireless communication channel such as a particular radio frequency. A communication channel is associated with a particular physical channel property which defines the channel. For example, the property may be a particular channel encoding scheme or a channel frequency, bitrate, symbol rate, particular time spacing and/or duty cycling properties. Other possible properties include: a channel phase; an electromagnetic polarization; and an electromagnetic orbital angular momentum. For a wired channel, a change in voltage/current may also or otherwise be used. The channel can also be defined in a broad sense, so as to include further properties of a potentially communicated signal, e.g. the communication protocol at a particular level of the OSI stack, e.g. MAC layer (e.g. 802.15.4 vs. 802.15.3), NWK level (e.g. ZigBee core vs. ZigBee Inter-PAN), etc. In some embodiments, the channel may be defined by security usage, for example: usage of a particular security service (e.g. encryption, authentication or integrity), an encryption key, a level of security, a particular security algorithm, or a particular secret security material. Other such channel properties will be well known to the person skilled in the art.

The channel property of the first communication channel is named the 'first channel property', and the channel property associated with the second communication channel is named the 'second channel property'.

The mesh network bridging device may be adapted to: receive first update information from the mesh network and adjust the second channel property (associated with the second channel) based upon the first update information. In alternative or further embodiments, the mesh network bridging device may optionally be adapted to incrementally or randomly adjust the second channel property (associated with the second channel) until acknowledgment information is received from the mesh network.

In the above described embodiments, the mesh network bridging device may thereby be adapted to automatically adjust the second communication channel so as to match a change in the communication channel of the mesh network. In other words, the mesh network is freely able to adjust a communication channel in which nodes of the mesh network may operate, without losing the ability to communicate with the mesh network bridging device and thereby the resource restricted device.

The above-described embodiments advantageously allow the mesh network to freely adjust its channel (e.g. frequency hop), as the mesh network bridging device may automatically re-establish connection to the mesh network. This thereby allows for improvements in security (as the communication channel and/or the security key used to protect communication on that channel of the mesh network need not remain constant) and noise reduction (as the said communication channel may automatically adjust when the channel is deemed too noisy).

In some embodiments, the mesh network bridging device is adapted to generate second update data based upon the second channel property (associated with the second channel); transmit the second update data to the resource restricted device; and adjust the first channel property (associated with the first channel) based upon the second update information. In other embodiments, the second update data may be generated by another device in the mesh network and simply routed through or passed by the mesh network bridging device to the resource restricted device.

Passing second update data to the resource restricted device allows for the resource restricted device to adjust its associated channel property so as to operate on the second communication channel. There may, therefore be a third mode of operation for the mesh network bridging device in which the mesh network bridging device communicates with both the mesh network and the resource restricted device over a single communication channel.

This advantageously increases the chances that messages transmitted by the resource restricted device will be successfully received by the mesh network bridging device, and thereby passed to the mesh network, because of the availability of the mesh network bridging device on the network. Furthermore, if there is a plurality of mesh network bridging devices in the network, the third mode of operation may allow or simplify communication between the resource restricted device and the plurality of mesh network bridging devices in range (of the resource restricted device), since dedicated channel switching behaviour is not required. It also improves the power efficiency of the mesh network bridging device, as energy is not expended in switching a channel property of the second communication channel. Also, it may allow a simple mesh network bridging device to handle multiple resource restricted devices or simplify the handling operation of multiple resource restricted devices.

During the third mode of operation, the mesh network bridging device may act as a node of the mesh network, and may communicate with a plurality of other nodes of the mesh network, while at the same time being capable of communicating with the resource restricted device.

The mesh network bridging device may be adapted to periodically switch between the first mode of operation and the second mode of operation.

For example, the mesh network bridging device may operate in the first mode of operation for a first predetermined time period, the first predetermined time being a length of between 50-1000 ms. The mesh network bridging device may similarly operate in the second mode of operation for a second predetermined time period, the second predetermined time period being in a range of approximately 10-50 ms. Other switching periods may be used dependent, for example, on a communication protocol used by the mesh network or resource restricted device (e.g. Wi-Fi, Bluetooth, ZigBee etc.).

Periodic switching may allow, for example, the mesh network bridging device to alternately 'listen' on the first and second channel of communication, so as to maximise the chances of receiving a signal from the mesh network and/or the resource restricted device.

According to a second aspect of the inventive concept, there may be provided a mesh network comprising: a mesh network bridging device as previously described; and a parent node adapted to communicate with the mesh network bridging device along the second communication channel, wherein the mesh network bridging device is adapted to only communicate with the mesh network via the parent node.

In some embodiments, the parent node is adapted to buffer data for transmitting to the mesh network bridging device when the mesh network bridging device is in the first mode of operation.

This advantageously allows the mesh network bridging device to freely listen on the first communication channel (i.e. communicate with the resource restricted device) without missing out on data to be received from the mesh network.

In some embodiments, the parent node may take over one or more communication tasks for the mesh network bridging device. In other words, the parent node may act on behalf of the mesh network bridging device for the purposes of some communication tasks. By way of example, the parent node may: respond to queries from other nodes on the mesh network, perform retries. perform network management actions (e.g. route discovery on behalf of/towards the network bridging device, etc.). This advantageously allows the mesh network bridging device to reduce the time spent on the second channel, without losing the operational status on the mesh network.

In at least one preferable embodiment, the mesh network is a wireless network operating in accordance with the ZigBee® standard; the mesh network bridging device is a green power proxy or a green power sink, preferably implemented by a ZigBee End Device logical device type; the resource restricted device is a green power device; and the parent node is a ZigBee® router node.

In an embodiment, there is provided a mesh network bridging device wherein, in response to the first channel property being the same as the second channel property, the mesh network device operates in a third mode of operation in which the mesh network bridging device communicates with both the mesh network and the resource restricted device over a single communication channel.

According to a third aspect of the inventive concept there is provided a method of connecting a resource restricted device to a mesh network, the resource restricted device communicating in a communication channel having a first channel property and the mesh network communicating in a communication channel having a second channel property, the method comprising: during a first mode of operation, communicating, using a mesh network bridging device, with the resource restricted device along a first communication channel having a first channel property; during a second mode of operation, communicating, using the mesh network bridging device, with the mesh network along a second communication channel having a second channel property; determining (740) if the first channel property of the first communication channel is different to the second channel property of the second communication channel and in response to the first channel property being different to the second channel property, switching between the first mode of operation and the second mode of operation.

The method may further comprise: receiving, at the mesh network bridging device, first update information from the mesh network; and adjusting the second channel property based upon the first update information.

The method may further comprise: incrementally or randomly adjusting the second channel property (associated with the second channel) until acknowledgment information is received from the mesh network at the mesh network bridging device.

The method optionally further comprises: generating, using the mesh network bridging device, second update data based upon the channel property of the second channel; transmitting, using the mesh network bridging device, second update data to the resource restricted device; and adjusting the first channel property based upon the second update information.

According to another aspect of the inventive concept, there is provided a computer program product comprising computer program code means adapted to perform all of the steps of any method as previously described when said program is run on a computing device having a processor.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a mesh network bridging device adapted to allow a resource restricted device to pass signals to and/or receive signals from a mesh network. The mesh network bridging device is operable over both a first communication channel, so as to communicate with the resource restricted device, and a second communication channel, so as to communicate with the mesh network. The mesh network bridging device is adapted to switch between a first and second mode of operation, associated with the first and second communication channel respectively, so as to alternately communicate with the resource restricted device and the mesh network bridging device. The mesh network bridging device may thereby act as a bridge between the resource restricted device and the mesh network bridging device.

As used herein, the term 'resource restricted device' refers to a device having limited, restricted or sporadic processing or communicating capabilities. By way of example, a resource restricted device may comprise a battery or power harvesting power source (e.g. solar cell, thermoelectric generator, etc.), which would limit the processing or communicating capabilities allowable. In other examples, a resource restricted device may be one which may only sporadically communicate (e.g. due to limited processing capabilities, caused by use of a simple and/or low power processor). In yet other embodiments, the resource restricted device is limited (e.g. by software or hardware) to only communicate at set intervals. Such resource restricted devices are typically ultra-low power devices.

Figure 1:
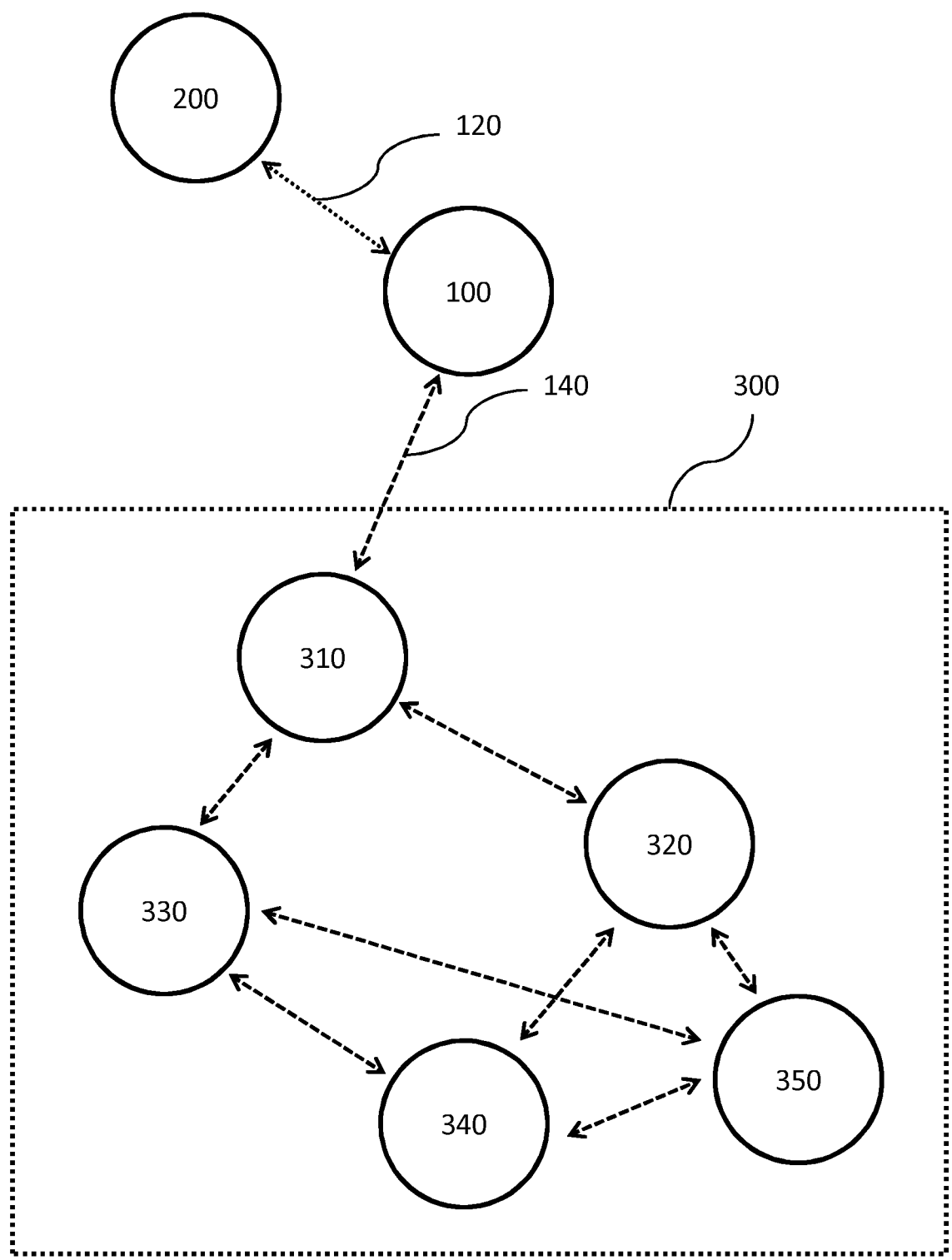
FIG. 1 illustrates a representative diagram of a mesh network bridging device according to a first embodiment of the invention.

A mesh network bridging device according to a first embodiment of the invention is described with reference to FIGS. 1 and 2. With specific reference to FIG. 1, there is identified a mesh network bridging device 100, a resource restricted device 200 and a mesh network 300.

The mesh network bridging device 100 is associable with at least a first communication channel 120 and a second communication channel 140. Each communication channel is associated with a respective channel property that identifies or otherwise distinguishes the respective communication channel. In other words, the first communication channel is associated with a first channel property, and the second communication channel is associated with a second channel property. The mesh network bridging device is adapted to be operable on the first and second communication channel.

Operating on a communication channel should be understood to mean that a transmitting element and/or receiving element of the mesh network bridging device is adapted to convey information across a particular path or medium having an identifying property. Such a communication channel may be otherwise called a transmission channel or may be understood to be a sub-channel of a particular channel medium.

By way of example, the first 120 and/or second 140 communication channel may be associated with a specific electromagnetic frequency or band of electromagnetic frequencies in which the mesh network bridging device may communicate with another device. In such an example, the mesh network bridging device may comprise a frequency-tuneable antenna capable of operating in a plurality of electromagnetic frequencies.

In other embodiments, the said communication channels may be associated with a specific encoding scheme that the mesh network bridging device and the resource restricted device or mesh network applies to signals transmitted to one another.

Typically, the mesh network bridging device is adapted such that it may only communicate along a single communication channel (i.e. either the first communication channel or the second communication channel) at any given time. This advantageously reduces the number of transmitters/receivers that the mesh network bridging device is required to have.

The mesh network bridging device 100 is adapted to communicate with the resource restricted device via the first communication channel 120. Further, the mesh network bridging device 100 is adapted to communicate with the mesh network 300 via the second communication channel 140. The mesh network may communicate with the mesh network bridging device via a specific node, identifiable as a parent node 310.

By way of further explanation, the first communication channel (and thereby the first channel property) is associated with the resource restricted device. In this way, the resource restricted device may be understood to communicate in the first communication channel. The second communication channel, and thereby the second channel property, is associated with the mesh network device. In this way, the resource restricted device may be understood to communicate in the second communication channel.

The mesh network bridging device is adapted to have at least two modes of operation or operating modes. There is identifiable a first mode of operation, wherein the mesh network bridging device communicates with the resource restricted device, and a second mode of operation, wherein the mesh network bridging device communicates with the mesh network.

The mesh network bridging device is adapted to switch between the first mode of operation and the second mode of operation. The switching between the first and second mode may be done at, for example, periodic intervals, such that the mesh network bridging device communicates with the resource restricted device along the first communication channel for a first predetermined period of time and subsequently communicates with the mesh network along a second communication channel for a second predetermined period of time.

It may therefore be understood that the mesh network bridging device switches between communicating over a first communication channel having a first channel property, and communicating over a second communication channel having a second channel property. In the first communication channel, the mesh network bridging device may communicate with the resource restricted device, and in the second communication channel the mesh network bridging device may communicate with the mesh network Thus, in the first mode of operation the mesh network bridging device may receive a first control signal from the resource restricted device, the signal being transmitted on the first communication channel. The first control signal may then, for example, be temporarily stored on a memory or storage system of the mesh network bridging device. Additionally or otherwise, the first control signal may be. forwarded unto to mesh network via the second channel, or executed locally (i.e. on the mesh network bridging device).

In a second mode of operation, the mesh network bridging device may then pass this first control signal to the mesh network on the second communication channel.

Similarly, in the second mode of operation the mesh network bridging device may receive a second control signal from the mesh network, the signal being carried by the second communication channel, and transmit (during the first mode of operation) the second control signal to the resource restricted device.

The mesh network bridging device may thereby act as a bridge or bridging node between the resource restricted device and the mesh network. The mesh network bridging device thereby enables the resource restricted device to communicate with the mesh network.

It is conceivable that the mesh network bridging device may receive information, data or signals from the mesh network that is not required to be passed onto the resource restricted device. In other words, it is not necessary for every signal received by the mesh network bridging device to be forwarded to the resource restricted device. For example, the signal may be for an action to be performed by the mesh network bridging device, such as maintenance.

In some embodiments, the bridging device may buffer information about the resource restricted device so as to be able to act on behalf of the resource restricted device. For example, the mesh network may request certain information about the resource restricted device, which the mesh network bridging device may be able to provide without necessarily consulting the resource restricting device. Such an embodiment would improve the efficiency of the mesh network, and reduce a workload or power consumption of the resource restricted device.

The nodes of the mesh network may be considered to always communicate with one another on the same communication channel, for example, on the second communication channel having the second channel property.

Thus, the second communication channel is typically the same communication channel in which nodes in the mesh network interact with one another. The first communication channel may be (in at least the first and second modes of operation) unique to a communication between the mesh network bridging device and the resource restricted device.

It may be understood that in a mesh network having a plurality of mesh network bridging devices and respective resource restricted devices, the respective first communication channel between each pair of mesh network bridging device and resource restricted device may be different. In other words, each resource restricted device of a network may communicate with one or more mesh network bridging devices over a different channel.

The mesh network bridging device 100 may communicate with the mesh network (over the second communication channel) via a parent node 310 of the mesh network 300. In other words, the mesh network bridging may be adapted to communicate with only a single node of the mesh network, this single node being the parent node 310.

The mesh network 300 further also comprises additional nodes 320, 330, 340, 350 which may communicate with one another and the parent node 310. The additional nodes may communicate with the mesh network bridging device via the parent node, and subsequently with the resource restricted device (via the mesh network bridging device). In other words, the additional nodes are designed to interact with one another and the parent node so to convey information between all nodes of the mesh network. Embodiments of other or further mesh networks will be well understood by a person skilled in the art.

In conceivable embodiments, the mesh network bridging device may communicate with one or more node of the mesh network (e.g. one or more of the additional nodes may be considered as a further parent node).

Figure 2:
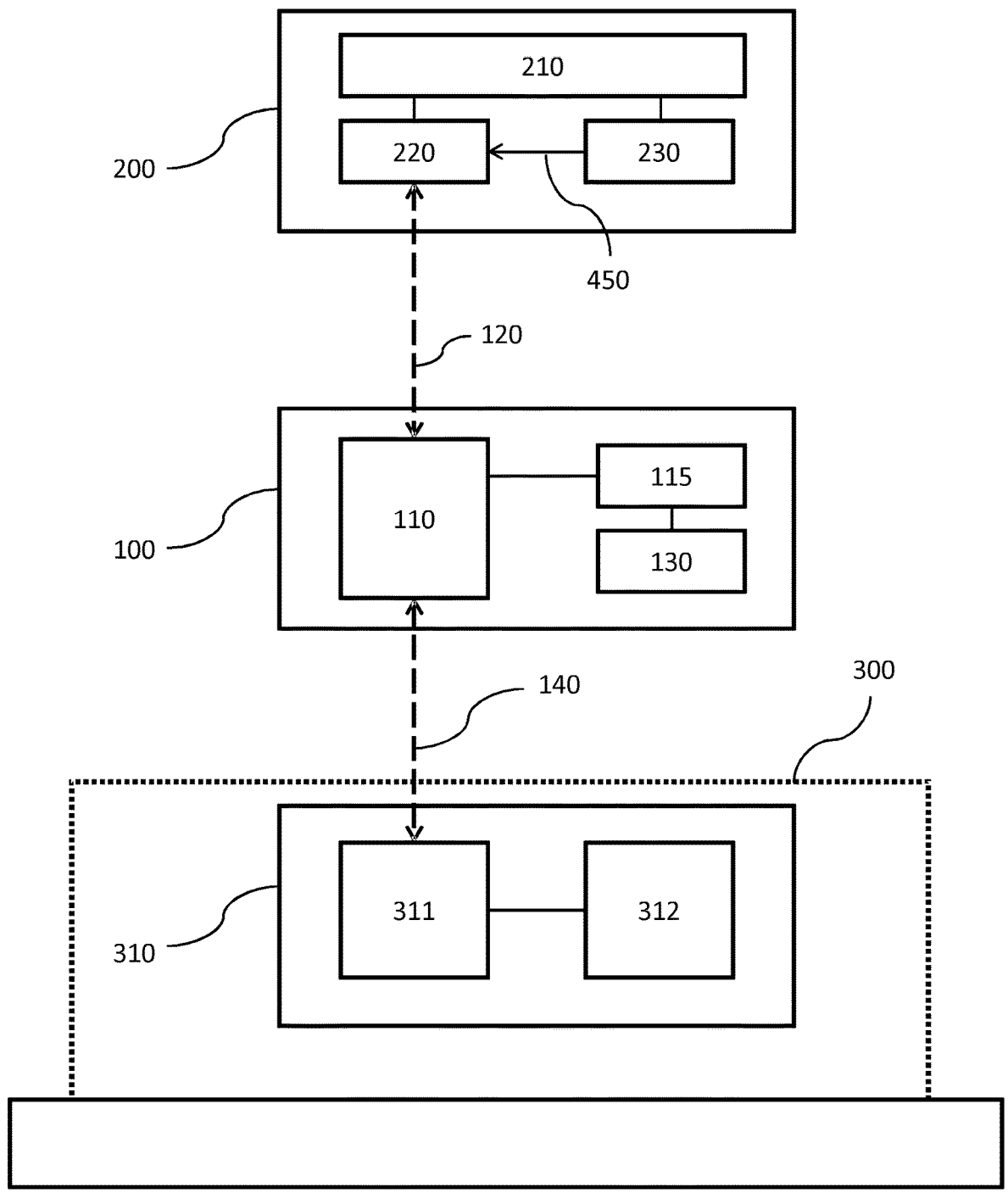
FIG. 2 shows a representative schematic of a structure of the mesh network bridging device according to the first embodiment of the invention.

Now with specific reference to FIG. 2, the basic structure of the mesh network bridging device 100 according to the first embodiment of the invention, a resource restricted device 200 and a parent node of a mesh network 300 may be readily understood.

The mesh network bridging device comprises a transceiver 110, a processor 115 and a memory 130.

The transceiver 110 is adapted to be operable on a first communication channel and a second communication channel so as to allow the mesh network bridging device to switch between communicating in the first and second communication channel. In some examples, the transceiver may comprise a tuneable antenna able to transmit and receive wireless signals (e.g. electromagnetic waves) in a plurality of wavelengths/frequencies.

The transceiver is therefore adapted to communicate with the resource restricted device 200 and the mesh network (e.g. via the parent node 310).

The processor 115 is adapted to be operable to switch the transceiver between the first and second communication channel, to enable the switching between the first and second mode of operation.

The memory 130 may be used to store (e.g. temporarily) data/information received from one of the resource restricted device or the parent node of the mesh network so as to enable transmission of the data to the other one of the resource restricted device or the parent node of the mesh network.

The resource restricted device comprises a power source 210, a resource restricted device transceiver 220 and a user input module 230.

The power source 210 may comprise a power harvester adapted to harvest power from a source external to the resource restricted device. For example, the power harvester may be adapted to convert solar or wind energy into power, use the energy of user interaction (e.g. toggling a switch), using electro-magnetical field changes (e.g. resulting from changes in current flow in a nearby wire, etc.), etc., which may be used to power the resource restricted device transceiver and/or the user input module 230. In other words, the power harvester may be a solar cell or a wind turbine, electro-mechanical harvester (e.g. magnet moving in a coil, piezoelectric element, etc.), a coil, etc. Other power harvesters suitable for harvesting power from external sources will be readily apparent to the person skilled in the art.

In other embodiments, the power source is another resource-restricted power supply or energy storage device, for example, a battery or cell. In some embodiments, the resource restricted device comprises a power harvester (e.g. a solar cell) and an energy storage device.

It should be understood that in general or typical use, the resource restricted device is not connected to a mains power supply. In conceivable embodiments, the power source is a rechargeable battery, such that the resource restricted device may be temporarily connected to a mains power supply for the purposes of recharging the battery.

The resource restricted device transceiver 220 of the resource restricted device (200) is adapted to transmit and optionally also receive information to/from the mesh network (via the mesh network bridging device).

The user input module 230 is adapted to generate a user input signal 450 for transmission to the mesh network (via the mesh network bridging device). The user input module may, for example, comprise a depressible switch which, in response to a user depressing the switch, generates the user input signal 450.

In some embodiments, the power harvester 210 and the user input module 230 are combined, such that power is generated as a direct response to a user input. By way of example, a combined power harvester and user input module may comprise piezoelectric material which, in response to a user deforming the piezoelectric material, causes a voltage to be generated. Other examples of combined user input modules and power harvesters will be readily apparent to the person skilled in the art, for example, triboelectric generators or thermoelectric generators, electro-mechanical generators (e.g. magnet moving within a coil), etc.

Optionally, the resource restricted device further comprises a processor and/or a memory unit. Use of a processor may improve the power efficiency of the resource restricted transceiver by, for example, aggregating data before sending it as processing is less energy intensive than transmission. Processing may, in some embodiments, be necessary for the use of security or transmission requirements.

The mesh network 300 comprises one or more interconnected nodes, each node being adapted to contribute to the provision of information between nodes of the mesh network.

The parent node 310 comprises a node transceiver 311 and a node processor 312. The parent node is the particular node of the mesh network with which the mesh network bridging device communicates.

The node transceiver 311 is adapted to be operable in at least the communication channel of the mesh network, e.g. the second communication channel. Typically, the channel property of this communication channel may be adjustable. For example, the channel property of the communication channel used by the mesh network may be automatically adjusted by the mesh network to account for noise and/or for security purposes.

Other possible reasons for adjusting the channel property of the communication channel used by the network include: the management of frequency resource (i.e. rearrangement of channel allocations to avoid two or more networks overlapping their frequency bands); connection of devices to the network that do not support particular frequencies (i.e. frequency capabilities of devices in the network); and removable of devices that do not support particular frequencies (e.g. to allow the mesh network to move back onto an less occupied channel).

The node processor 312 is adapted to interpret signals received on the node transceiver, and communicate with other nodes in the mesh network (e.g. via the node transceiver 311).

Figure 3:
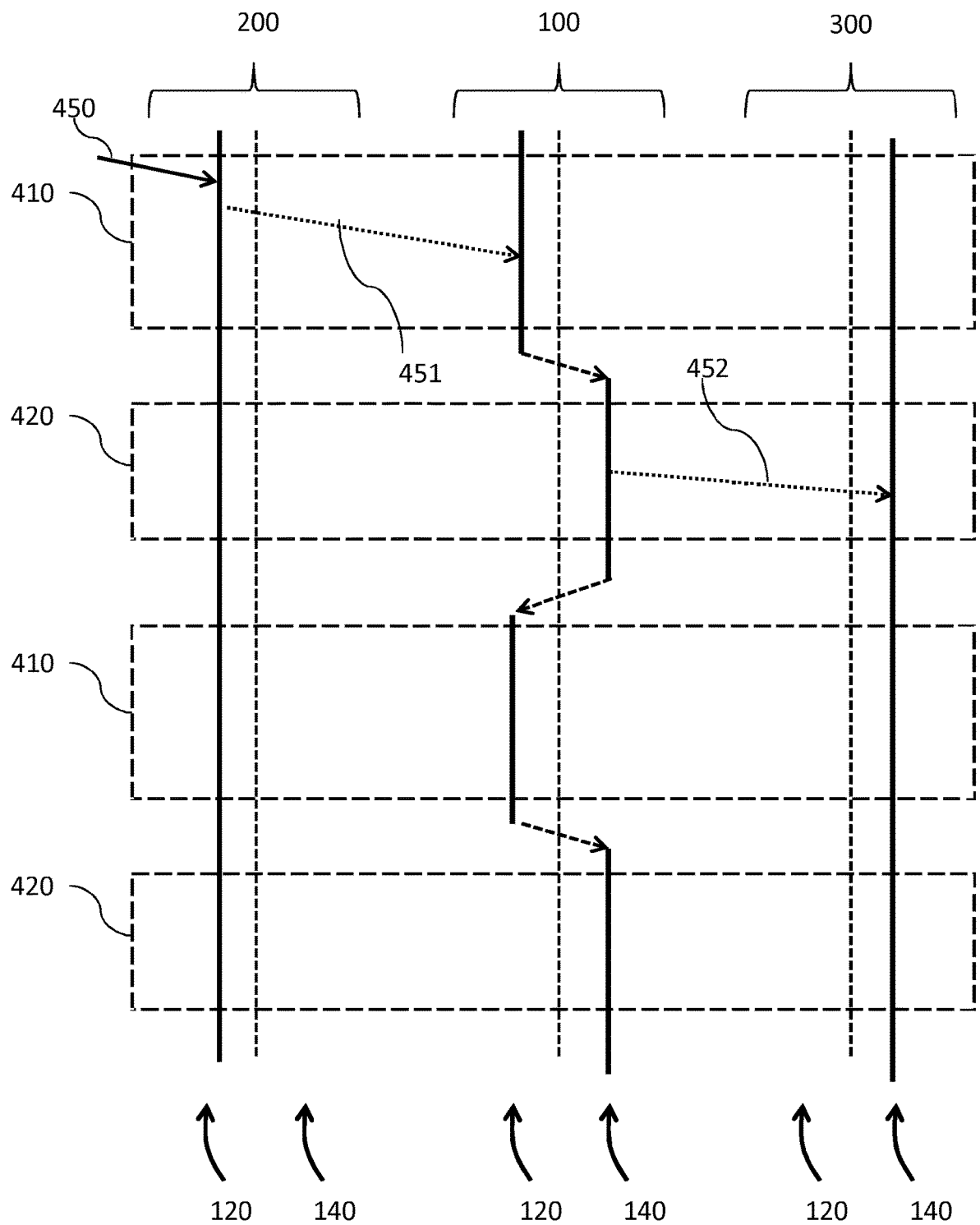
FIG. 3 illustrates a schematic chart of a first operation of the mesh network bridging device according to the first embodiment of the invention.

A first operating procedure of the mesh network bridging device 100 according to the first embodiment of the invention will be more readily understood with reference to the chart exhibited in FIG. 3. Vertical displacement (e.g. down the page) is indicative of the passage of time.

Identifiable in FIG. 3 are communication channels 120, 140 associable with the mesh network bridging device 100, the mesh network 300 and the resource restricted device 200.

There is a communication channel 120, 140 either side of the broken vertical lines in FIG. 3. In other words, the broken vertical lines indicate a conceptual demarcation of each communication channel.

The vertical unbroken lines are indicative of the present communication channel in which the mesh network bridging device, the mesh network and the resource restricted device presently communicate. For example, the resource restricted device 200 communicates only over the first communication channel 120, while the mesh network 300 communicates only over the second communication channel 140.

Initially, the mesh network bridging device operates in a first mode of operation 410, where it is in a same communication channel as the resource restricted device; that is the first communication channel 120. Thus, during the first mode of operation, the mesh network bridging device may communicate with the resource restricted device, but may not communicate with the mesh network.

During this first mode of operation 410, the mesh network bridging device 100 receives a first control signal 451 from the resource restricted device 200. The resource restricted device may, for example, have generated this first control signal 451 in response to a user input 450.

The mesh network bridging device 100 then switches into a second mode of operation 420, wherein it is able to communicate over a second communication channel 140, the second communication channel being the communication channel associated with the mesh network. During the second mode of operation, it is apparent that the mesh network bridging device operates over a different communication channel to the resource restricted device, and may thereby not communicate with the resource restricted device.

During this second mode of operation, the mesh network bridging device may be able to pass the first control signal 452 to the mesh network. In this mode of operation, the mesh network bridging device may otherwise or additionally pass data relating to the mesh network bridging device (such as a sensor report of the bridging device) to other nodes in the mesh network (e.g. the parent node).

Thus the mesh network bridging device may act as a bridge between the resource restricted device and the mesh network.

It will be readily apparent that the mesh network bridging device is adapted to switch between the first mode of operation 410 and the second mode of operation 420. Thus, following the passing of the message to the mesh network, the mesh network bridging device may switch back to the first mode of operation 410.

The switching between the first mode of operation and the second mode of operation is preferably periodic, such that the mesh network bridging device may periodically 'check' on the resource restricted device and the mesh network respectively.

By way of example, a bridging device may change switch between the first mode of operation and the second mode of operation every 10-50 ms, such that both the first mode of operation and the second mode of operation are active for the same respective period of time.

In other embodiments, the mesh network bridging device may operate in the first mode of operation for a first predetermined period of time and may operate in the second mode of operation for a second predetermined period of time.

For example, the mesh network bridging device may be in the first mode of operation for between 100-2000 ms, and subsequently be in the second mode of operation for between 50-100 ms. The first period of time (i.e. the length of time for which the first mode of operation is active) is preferably greater than the second period of time. Preferably, the ratio of time the mesh network bridging device operates in the first mode of operation to the second mode of operation is no less than 100:1, for example, 150:1, for example 200:1. This will advantageously improve the likelihood that a first control signal may be received by the mesh network bridging device for passing to the mesh network.

Alternatively, the length/frequency of the stay of the bridging device on the second communication channel can be adapted to any communication properties of the resource restricted device; e.g. to coincide with a periodic inactivity phase of the resource restricted device.

In the event that the first control signal 451 is unsuccessful in being passed to the mesh network bridging device (e.g. the mesh network bridging device is in the second mode of operation 420 when the message is sent), the resource restricted device may resend the message to the mesh network bridging device after a period of time. This may be in response to a second user input, for example.

In some embodiments, the resource restricted device 200 may be adapted to send multiple copies of the first control signal 451 to the mesh network bridging device 100 spanning over a period of time (e.g. greater than the length of time the mesh network bridging device is in the second mode of operation), such that at least one copy of the first control signal is receivable by the mesh network bridging device. The mesh network bridging device may be adapted to receive a plurality of copies of the first control signal and be able to detect that multiple copies of the first control signal have been received (e.g. based on a message sequence number, as is well known in the art). The mesh network bridging device may be further adapted to pass only a single copy of the first control signal to the mesh network. Such embodiments advantageously increase the likelihood that a control signal will be successfully received from the resource restricted device for transmission to the mesh network.

Figure 4:
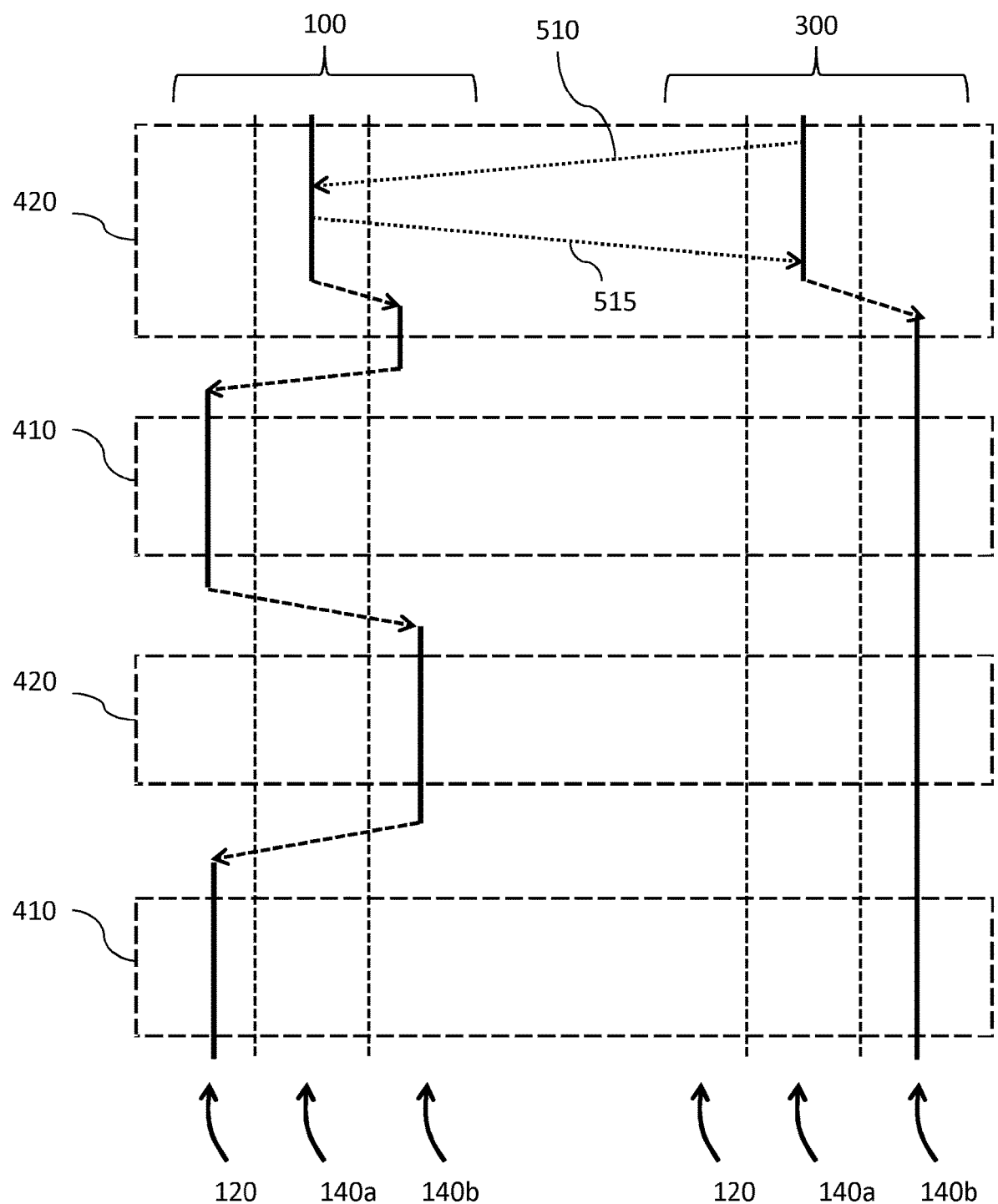
FIG. 4 illustrates a schematic chart of a second, optional, operation of the mesh network bridging device according to the first embodiment of the invention.

A second, optional, operating procedure of the mesh network bridging device 100 according to the first embodiment of the invention is described with reference to FIG. 4. Once again, vertical displacement (e.g. down the page) is indicative of the passage of time. FIG. 4 only identifies the communication channels associated with the mesh network bridging device 100 and the mesh network 300.

In the second mode of operation 420, where the mesh network bridging device may communicate with the mesh network, the mesh network bridging device may receive first update data 510 from the mesh network, e.g. containing an update for the channel property of the first channel. The mesh network bridging device may be used to update the second channel property of the second communication channel 140a to result in a new second communication channel 140b.

In other words, the mesh network 300 may pass first update data to the mesh network bridging device 100 to indicate an intention to change a property of the communication channel used by the mesh network to a new channel property. The mesh network bridging device may then, based on this information, adjust the second channel property of the second communication channel 140a to match the intended new channel property, thereby determining the new second communication channel 140b.

For example, the second channel property may be a specific frequency in which the mesh network bridging device communicates with the mesh network, and the first update data may comprise information about a new specific frequency for the second communication channel.

Such an embodiment advantageously allows the mesh network bridging device to continue to communicate with the mesh network when the mesh network changes channel properties.

In preferable further embodiments, the mesh network bridging device passes first acknowledgement data 515 back to the mesh network 300 to confirm that the first update data has been received. This allows the mesh network to be assured that the mesh network bridging device intends to amend the second channel property.

In some embodiments, in response to an instruction from the mesh network, the mesh network bridging device generates data or a message comprising data for provision to the mesh network bridging device. This message may comprise data for updating the second channel property (associated with the second communication channel).

For example, a node on the mesh network may desire the second channel property to be adjusted for some reason (e.g. a new device only capable of using the same property as the present second channel property is connected to the mesh network). Based on this indicated desire, the mesh network bridging device may generate data for updating the second channel property. In another example, the mesh network bridging device may receive an instruction that instructs itself to a channel property (of the first or second channel), triggering generation of a message for the harvesting device.

For embodiments wherein the mesh network bridging device periodically switches between the first mode of operation and the second mode of operation, this advantageously allows the mesh network bridging device to determine whether the second communication channel has changed (e.g. whether first update information is to be received).

Figure 5:
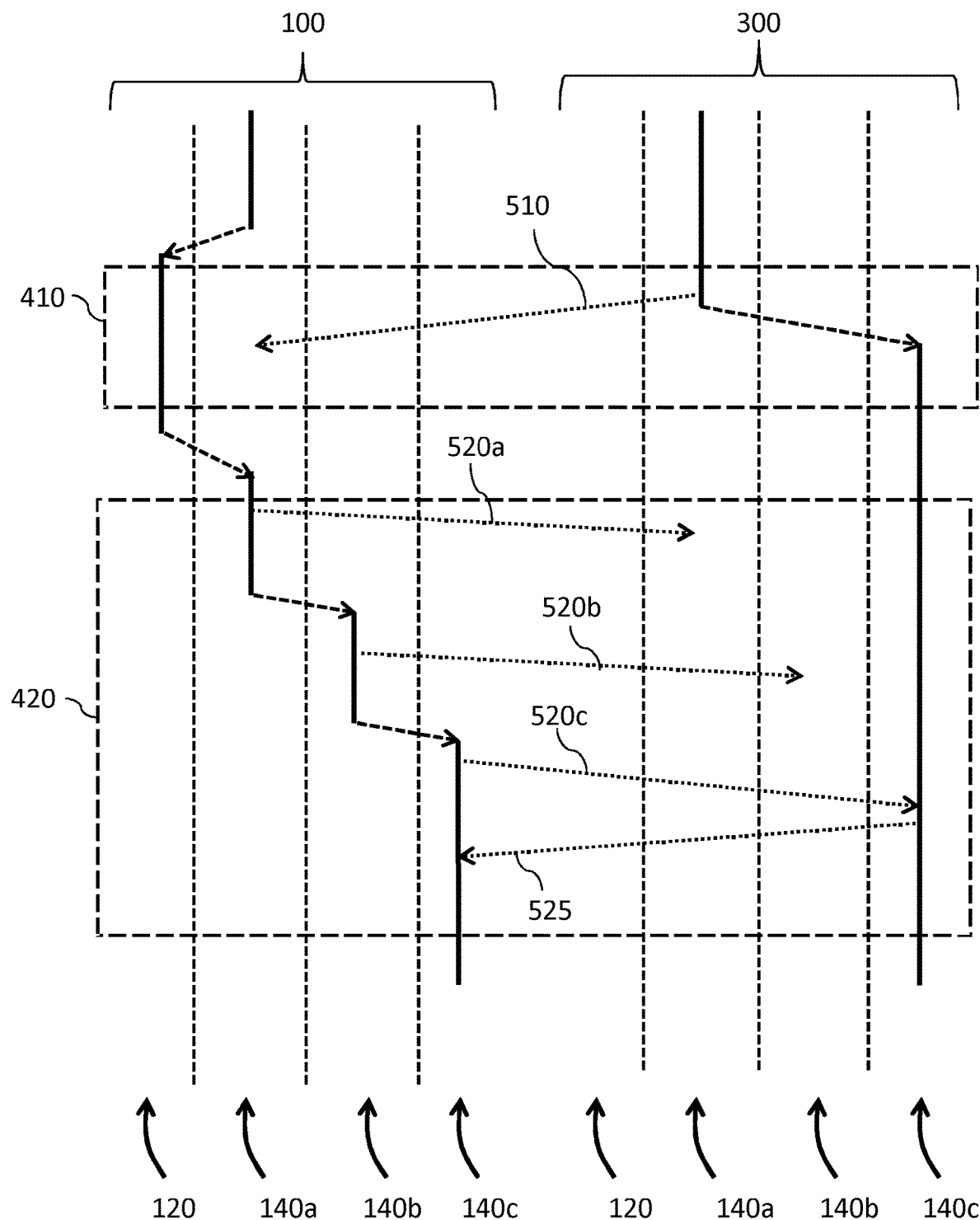
FIG. 5 illustrates a schematic chart of a third, optional, operation of the mesh network bridging device according to the first embodiment of the invention.

A third, optional, operating procedure of the mesh network bridging device 100 according to the first embodiment of the invention will be understood with reference to FIG. 5.

The mesh network may wish to switch to a new communication channel 140c having a new channel property, and may thereby attempt to send first update data 510 to the mesh network bridging device.

The mesh network bridging device may be unable to receive this information. For example, at a time of transmittal of the first update data 510, the mesh network bridging device may be in the first mode of operation. Accordingly, the mesh network bridging device may be unable to receive the first update data 510 from the mesh network (as it is operating over a different communication channel). Thus, the mesh network bridging device may not be able to adjust the second channel property of the second communication channel in order to match the change made to the communication channel of the mesh network.

In such a scenario, the mesh network bridging device 100 may be adapted, upon returning to the second channel and finding the network no longer present there, to incrementally, randomly or strategically (e.g. trying primary channel first and secondary channels later) adjust the channel property of the second communication channel until contact is re-established with the mesh network. Alternatively, it may use other means to re-establish communication with the network, e.g. using re-association or re-joining exchanges.

In other words, the mesh network bridging device 100 may be adapted to detect when communication with the mesh network 300 is no longer or not possible (i.e. when the communication channel of the mesh network has a different channel property to the second communication channel). Incremental, random or other strategic adjustments may be made to the second channel property of the second communication channel until the second channel property matches the new channel property of the mesh network.

For example, the mesh network bridging device 100 may adjust the second channel property of the second communication channel 140a to result in a first alternative second communication channel 140b. As this first alternative second communication channel is not associated with the same channel property as the new communication channel 140c of the mesh network, the mesh network bridging device may automatically adjust the second channel property of the first alternative second communication channel to result in a second alternative communication channel 140c. The second alternative second communication channel 140c matches the channel property of the mesh network, and the mesh network bridging device may thereby communicate with the mesh network. Accordingly, the adjustments are halted at this point. Those changes do not need to be communicated to the resource restricted device, at all or until the bridging device successfully reconnects with the mesh network.

By way of example only, the communication channel of the mesh network 300 may be associated with a specific frequency, for example, 2450 MHz. The mesh network may choose to switch this specific frequency to an increased frequency, e.g. 2452 MHz. The mesh network bridging device 100 may adjust the frequency of the second communication channel (e.g. increase to 2451 MHz, then 2452 MHz) until connection with the mesh network is re-established.

In some embodiments, the mesh network bridging device may cycle through a stored list of known possible channel properties until a correct channel property is attained (i.e. until the mesh network bridging device may contact the mesh network via the second communication channel).

In particular embodiments, after each change in the second channel property, the mesh network bridging device may send data 520a, 520b, 520c across the second communication channel in an attempt to contact the mesh network. The mesh network bridging device may stop its adjustment of the second channel property when second acknowledgement data 525 is received from the mesh network.

In other words, the mesh network may be adapted to send second acknowledgment data 525 to the mesh network bridging device when confirmation data 520c is successfully received, so as to indicate that the second channel property of the second communication channel has correctly identified, and that communication between the mesh network and the mesh network bridging device is possible.

In some embodiments, the mesh network bridging device 100 adjusts the second channel property a predetermined period of time after receiving the first update data (e.g. to give the other mesh nodes time to start properly operating on the new channel).

In other or further embodiments, the first update data comprises data associated with an indication of a time when the second channel property is to be adjusted. For example, the first update data may comprise a timestamp of when a change in the second channel property was instructed, from which a time of changing the second channel property may be determined (e.g. a predetermined time period after the timestamp). This advantageously ensures that the mesh network bridging device operates on the same channel as the mesh network for the greatest period of time possible, to increase the likelihood that messages from the resource restricted device are passed to the mesh network.

Such an embodiment advantageously allows the mesh network bridging device to adaptively match a change in the communication channel of the mesh network, and ensures that the mesh network may continue to adjust its communication channel for the purposes of noise mitigation and/or security without the concern of losing connectivity with the mesh network bridging device and hence the resource restricted device.

The mesh network bridging device may be able to detect that communication with the mesh network is not or no longer possible by periodically or dynamically (e.g. upon switching into the second mode of operation) attempting to perform handshaking with the mesh network. Other method of detecting communication is no longer possible between a pair of devices will be well known to the person skilled in the art.

In particular embodiments, the parent node 310 of the mesh network 300 (i.e. a node of the network with which the mesh network bridging device communicates) may be adapted to buffer or temporarily store data that is to be passed to the mesh network bridging device 100 and/or the resource restricted device 200 until contact with the mesh network device is possible or enabled. In particular, the parent node may store the first update data for updating the second channel property of the second communication channel associated with the mesh network bridging device.

The above-described embodiments advantageously allows the mesh network 300 to freely adjust its channel (e.g. frequency hop), thereby allowing for improvements in security (as the channel need not remain constant) and noise reduction (as the channel may automatically adjust when the channel is deemed too noisy).

Figure 6:
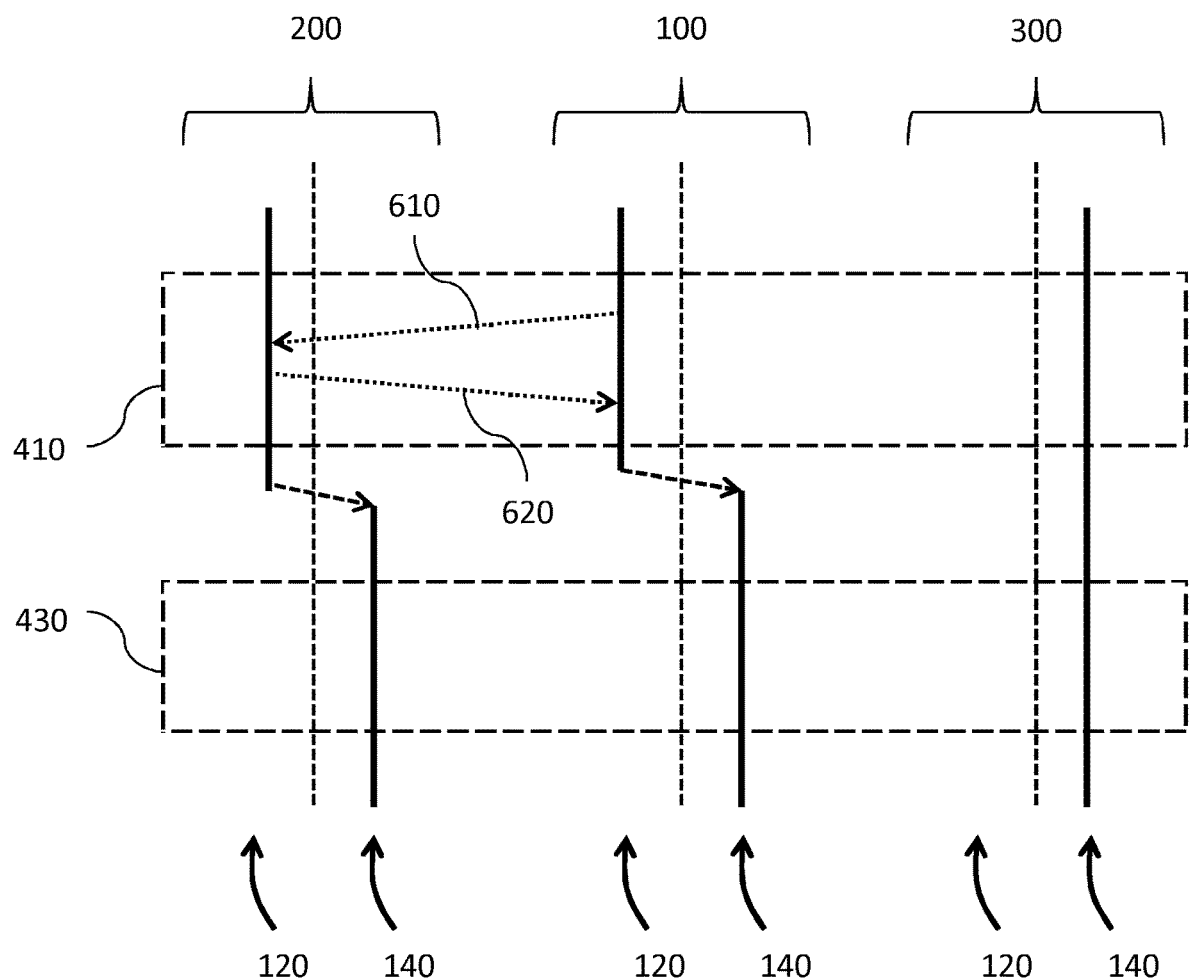
FIG. 6 illustrates a schematic chart of a fourth, optional, operation of the mesh network bridging device according to the first embodiment of the invention.

A fourth, optional, operation of the mesh network bridging device is described with reference to FIG. 6.

The mesh network bridging device may be adapted to transmit second update data 610 to the resource restricted device, the second update data 610 being based on the channel property of the second communication channel. The mesh network bridging device is then able to update the first channel property of the first communication channel so as to match the second channel property associated with the mesh network bridging device.

It will be readily apparent that the transmission of the second update data may occur during the first mode of operation 410.

In preferable embodiments, the first channel property of the first communication channel is periodically or selectively updated so as to match the second channel property of the second communication channel. This ensures that a single transceiver of the mesh network bridging device may advantageously operate on a single communication channel. That is, the mesh network, the mesh network bridging device, and the resource restricted device all communicate via the same communication channel.

The mesh network may, accordingly, be adapted to have a third mode of operation 430, wherein the mesh network bridging device is adapted to communicate with the resource restricted device and the mesh network in the same communication channel (i.e. the first communication channel is identical to the second communication channel).

In a further embodiment, the first channel property of the first communication channel may only be updated upon successful transmission of the second update information (e.g. when transmission is acknowledged by the resource restricted device). Thus, the resource restricted device may be adapted to generate first acknowledgment data 620 for provision to the mesh network bridging device so as to acknowledge successful receipt of the second update information.

In other embodiments, the first channel property of the first communication channel associated with the mesh network bridging device may be updated without transmission being acknowledged by the resource restricted device. In such an embodiment, the mesh network bridging device may detect, after a predetermined period of time, that communication with the resource restricted device is not possible (e.g. the mesh network bridging device may detect that no messages have been received during the predetermined period of time). Accordingly, the first channel property may be readjusted back to the previous first channel property in order to re-establish communication with the resource restricted device.

Put yet another way, in an embodiment the mesh network bridging device is adapted to determine whether the first channel property of the first communication channel (associated with the resource restricted device) is different to the second channel property of the second communication channel (associated with the mesh network). In response to determining that the first channel property is different to the second channel property, the mesh network bridging device is adapted to switch between the first mode of operation (in which it communicates with the resource restricted device) and the second mode of operation (in which it communicates with the mesh network).

Put simply, the mesh network bridging device is adapted to determine whether the resource restricted device and the mesh network are operating on different communication channels, and, in response to this determination, switch between the different communication channels so as to allow the resource restricted device to communicate with the mesh network. This provides the advantage of ensuring that a resource restricted device (e.g. which has yet to switch communication channels or is unable to switch communication channels) may continue to communicate with the mesh network, whilst also advantageously allowing the resource restricted device to operate on a same communication channel as the mesh network.

By way of example, consider a scenario in which the mesh network device and the resource restricted device are communicating (with the mesh network bridging device) in a same communication channel. That is, a scenario in which the first channel property is the same as the second channel property (e.g. a same channel frequency). If a frequency of the channel in which the mesh network communicates changes, without the frequency of the channel of the resource restricted device also changing, the mesh network bridging device may determine that the resource restricted device no longer operates in the same communication channel. In other words, the mesh network bridging device may determine that the first channel property is different to the second channel property.

It may be understood that the present invention thereby allows a resource restricted device which is unintentionally maintained on an old channel (e.g. due to a temporary inability to receive update data) to maintain communication with the mesh network.

Preferably, the mesh network bridging device is adapted to detect a change in the second channel property, and determine whether the first channel property has also changed accordingly (e.g. determining whether it has received the first acknowledgment data 620 from the resource restricted device). In response to determining that the first channel property has not changed accordingly (i.e. the resource restricted device is operating on the old communication channel), the mesh network bridging device is adapted to switch between the first mode of operation and the second mode of operation.

In a scenario in which the mesh network bridging device has determined that a change in the second channel has occurred (and is thereby switching between the first mode of operation and the second mode of operation), this switching is preferably periodic (i.e. switching at regular intervals). This would allow the mesh network bridging device to determine whether further updates or changes to the second channel property (of the second communication channel) have been made. This thereby reduces a chance that a mesh network bridging device will lose contact with the mesh network.

In other embodiments, the resource restricted device may be purposively put on a separate channel to the mesh network. This may, for example, reduce the interference from the network with regard to the resource restricted device.

In some embodiments the mesh network bridging device may be adapted to only change the first channel property of the first communication channel in response to a user input or intervention on either the mesh network bridging device or the resource restricted device or both.

For example, a user may manually alter the first channel property on the resource restricted device, which transmits an update signal to the mesh network bridging device. The mesh network bridging device may then adjust its own first channel property to match that of the manually adjusted resource restricted device. A user may thereby manually match the first channel property to the second channel property. In this event, the mesh network bridging device may enter the third mode of operation, so as to communicate with the mesh network and the resource restricted device over the same communication channel.

Embodiments of the mesh network bridging device may be used to particular advantage for a wireless mesh network operating on a ZigBee® communication protocol, otherwise named a ZigBee network.

A skilled person would readily understand there to be three logical device types defined in the ZigBee standard: a ZigBee end device, a ZigBee coordinator and a ZigBee router. A ZigBee end device is adapted to communicate via only a single other device. A ZigBee coordinator is able to create a centralised security network (i.e. is the originator of the ZigBee network). A ZigBee router is adapted to communicate with a plurality of other devices and route messages from and to these devices, as well as play the parent role for the ZigBee end devices.

The communication channel of the ZigBee network is associated with a channel property, and in particular a channel frequency.

The ZigBee network may, for example, have frequency agility, wherein the frequency associated with the communication channel of the ZigBee network automatically adjusts to account for external interference (e.g. noise) or for purposes of security. By way of example this may be done at periodic intervals or in direct response to external interference.

Although frequency agility is an optional feature of ZigBee networks, it has become increasingly preferable as more and more wireless networks (both Wi-Fi and ZigBee) are deployed at homes, offices and so on. In some cases, the communication channels of the ZigBee network are also used by other devices, for example the popular Wi-Fi devices. In such a scenario, one particularly effective way to reduce the effects of channel contention or competition (and thereby possible data collision) with minimal human input is to automatically perform frequency agility.

In at least one embodiment, a predetermined node of the ZigBee network is a network manager responsible for determining the properties of the communication channel over which nodes of the ZigBee network may communicate. The network manager may, for example, send a network update request to other nodes of the ZigBee network in order to indicate an intention to switch frequency. For example, the network manager may send out a ZDP (ZigBee Device Profile) network update request command to other nodes, and the whole network switches communication channel after a defined period of around 7.5 s.

In particular, the resource restricted device may be a Green Power Device (GPD), which operates on an enhanced ZigBee specification to permit ultra-low-power devices to connect to a ZigBee network. Such green power devices use a significantly low amount of energy (e.g. <200 µJ) in operation such that they are able to operate from energy harvested from their environment.

Green Power Devices may be split into two particular types: constrained GPD or evolved GPD.

A constrained GPD may only operate or be otherwise active at irregular time intervals (i.e. upon receiving a user input). Accordingly, a constrained GPD may be unable to switch a channel property of a communication channel (in which it operates) in response to a change in the channel property of the communication channel of the ZigBee network. In some embodiments, the constrained GPD may be unable to switch a communication channel and may instead, for example, only be able to operate over a single channel.

An evolved GPD is adapted to be active for periodic intervals and is typically able to perform bidirectional communication. It will be readily apparent that such an evolved GPD may also be unable to switch frequency of the communication channel (in which it operates) in order to match that of the ZigBee network, as it may be inactive during a time of switching or a time when a switch request is broadcast.

In a ZigBee network, the mesh network bridging device may be a Green Power Infrastructure Device (e.g. a green power proxy or a green power sink). During the typical operating procedure of the mesh network bridging device (i.e. in the first and second modes of operation) the mesh network bridging device may be thought to represent the green power device in the mesh network, and the parent node of the mesh network represents the mesh network bridging device in the mesh network.

A skilled person may therefore understand that (at least during the first and second mode of operation) the mesh network bridging device may act, in accordance with the ZigBee communication standard, as both a ZigBee router (with respect to the resource restricted device) and a ZigBee end device (with respect to the parent node of the mesh network). When in the third mode of operation, the mesh network bridging device may act only as a ZigBee router.

The parent node is preferably a ZigBee router, and may generally view the mesh network bridging device as a ZigBee end device (when the mesh network bridging device is in the first and/or second modes of operation). In some embodiments, the parent node may be a ZigBee coordinator.

In some embodiments the mesh network bridging device acts as a low power router, using the known Low Power Router (LPR) feature of the ZigBee communication protocol. This allows the mesh network bridging device to continue performing the routing and communicating operations with multiple neighbouring nodes over the second communication channel, while being able to temporarily disappear from the ZigBee network (so as to listen on the first communication channel).

This embodiment has the advantage that the neighbouring nodes are forced to use the low power router protocol to send something to the mesh network bridging device, which requires sending a wake-up sequence until the next activity period of the mesh network bridging device. This advantageously has a higher message delivery probability than the time-limited frame buffering mechanism, such as that that may be performed by the parent node of the mesh network (i.e. the buffering of data for passing to the mesh network bridging device/resource restricted device).

In other embodiments the mesh network bridging device acts a ZigBee router having a modified behaviour (i.e. is a limited-functionality router), so as to be able to spend maximum of its time on the ZBLD channel.

Such a mesh network bridging device may modify its ZigBee router behaviour by avoiding accepting associations from ZigBee end devices and only accepting associations from other ZigBee routers (which most probably use a different dedicated procedure for linking with the mesh network bridging device). This can be accomplished by, for example: responding only to active scan (beacon request commands) of full function devices (which will become neighbour routers, so need to add the mesh network bridging device to their neighbour tables), and silently ignoring active scans of reduced function devices; or responding to association requests of both full and reduced function devices with indication of no child capacity.

The mesh network bridging device may further modify its behaviour by avoiding routing on behalf of other routers (for the mesh network bridging device is not to be removed from the other routers' neighbour tables, even when the mesh network bridging device fails to forward the packets when disappearing from the network so as to listen to the first communication channel). This can be accomplished by the mesh network bridging device not forwarding route requests (RREQ) to other nodes of the ZigBee network when the RREQ does not originate from the mesh network bridging device itself, or forwarding it but adding the maximum link cost to the total path cost. Since each RREQ is simply re-broadcast and the success rate is not tracked using passive acknowledgement (as it is the case for other broadcast-based communication) this method will not harm the link cost/success rate statistics held on the neighbour nodes, and thus not influence the persistence of the links to the neighbours. On the other hand, the mesh network bridging device may still need to route on behalf of the resource restricted device (and for itself, if required). Therefore, it's interested in keeping good link cost to the neighbour routers, especially the outgoing cost (i.e. as observable by the neighbours). Furthermore, the other routers track the router's presence by the link status messages sent by the router; as long as the mesh network bridging device sends them on time, it may appear to its neighbour routers as "always present".

Since the mesh network bridging device in the router function will have no parent to buffer messages for it, it will have to perform network rejoining/path rediscovery on channel changes in the ZigBee network.

Whilst the above embodiments relate primarily to a ZigBee network after a channel change (e.g. after a frequency hop of the second communication channel), it is equally applicable to situations when a resource restricted device does not support the complete channel set, and in particular does not support the current operational channel of the network. In other words, there may be a situation where the resource restricted device is not capable of operating in the second communication channel due to, for example, a lack of channel support or power.

In such a case, the mesh network bridging device may operate on two network channels, so that the resource restricted device is operable on one of the channels it supports.

There may be provided a plurality of nodes of the mesh network that are capable of acting as a mesh network bridging device having the first and second modes of operation. Such nodes (e.g. ZigBee routers) are clearly 'multi-channel operable'. In typical such embodiments, the ability to act as a mesh network bridging device must be triggered in the multi-channel operable nodes.

In one embodiment, the mesh network bridging device can autonomously make such a decision, e.g. upon receiving first update data from the mesh network (e.g. ZigBee network). This solution is particular advantageous if the mesh network bridging device is the one and only device capable of communicating with this resource restricted device directly (i.e. in radio range of the resource restricted device).

In an embodiment, the decision as to which device (capable of acting as a mesh network bridging device) shall start operating on multiple channels can be taken by a maintenance device, e.g. a network manager device triggering the channel change, an application behind a gateway, a commissioning tool, etc. For this, a new Green Power cluster command may need to be defined or an existing command modified, since the current channel changing commands work only in commissioning mode (the GP Proxy Commissioning Mode command) or in connection with bidirectional communication (GP Response command); to make this decision, the maintenance device may need additional information, e.g. regarding the network topology, quality of resource restricted device to mesh network bridging device links, etc.

In yet another embodiment, if multiple mesh network bridging devices are capable of communicating with a particular resource restricted device, the mesh network bridging devices may need to negotiate which of them shall start multi-channel operation. For this, the Green Power cluster commands may need to be added or modified, e.g. to allow GP Notification for a unidirectional GPDF to carry the proxy's address and distance information.

Alternative or additional channel properties with which a channel may be associated with than those above-described are well known to the person skilled in the art. For example, a channel property may be a channel phase (e.g. with relation to a mutual clock); an electromagnetic polarization; and an electromagnetic orbital angular momentum. For a wired channel, a change in voltage/current may also or otherwise be used. The channel can also be defined in a broad sense, so as to include further properties of a potentially communicated signal, e.g. the communication protocol at a particular level of the OSI stack, e.g. MAC layer (e.g. 802.15.4 vs. 802.15.3), NWK level (e.g. ZigBee core vs. ZigBee Inter-PAN), etc. In some embodiments, the channel may be defined by security usage, for example: usage of a particular security service (e.g. encryption, authentication, or integrity), a level of security, a particular security algorithm, or a particular secret security material.

In particularly advantageous embodiments, the resource restricted device may be adapted for controlling a light source connected to the mesh network. In such an embodiment the resource restricted device may be a wireless smart switch, for example the Philips® Hue tap.

In other or further advantageous embodiments, the resource restricted device is solar-powered, such that is comprises one or more photovoltaic cell. Preferable embodiments of a resource restricted device comprise a solar-powered sensor, such as a light sensor (detecting at least one of: an intensity, color, temperature, luminosity and so on). Some advantageous embodiments of resource restricted devices comprise battery powered, ultra-low power devices, for example, a remote control or sensor.

Suitable wireless communication protocols that may be used in the communicate with the mesh network bridging device, the resource restricted device and the mesh network include an infrared link, ZigBee, Bluetooth, a wireless local area network protocol such as in accordance with the IEEE 802.11 standards, a 2G, 3G or 4G telecommunication protocol, and so on. Other formats will be readily apparent to the person skilled in the art.

In at least one embodiment, there may be provided a plurality of mesh network bridging devices for connection a resource restricted device to a mesh network. Each mesh network bridging device may be as previously described. The switching between the first and second mode of operation for each mesh network device may be timed such that at least one mesh network bridging device in the plurality of mesh network bridging devices is always in the first mode of operation, and may therefore communicate with the resource restricted device. This advantageously increases the probability of receiving a message from the resource restricted device.

It will be readily apparent that a plurality of resource restricted devices may communicate with a single mesh network bridging device. In other words, there may be a plurality of resource restricted devices each able to communicate over a first communication channel with the mesh network bridging device.

Figure 7:
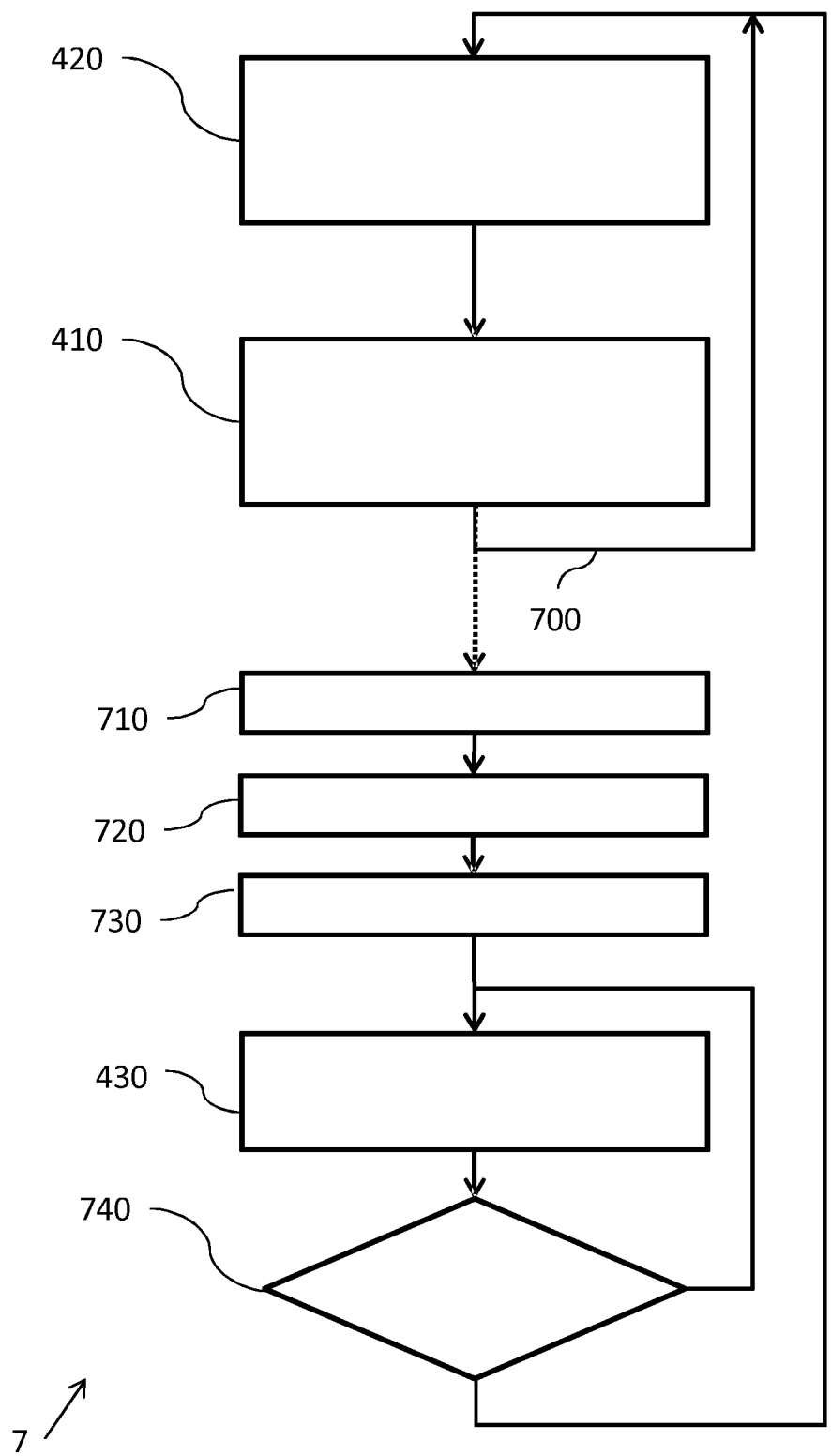
FIG. 7 depicts a flowchart of a method of connecting a resource restricted device to a mesh network according to a second embodiment of the invention.

An embodiment of a method for connecting a resource restricted device to a mesh network will be readily understood with reference to FIG. 7.

The method 7 comprises communicating 410, using a mesh network bridging device in a first mode of operation, with a resource restricted device along a first communication channel having a first channel property. The method also comprises communicating 420, using the mesh network bridging device in a second mode of operation, with a mesh network along a second communication channel having a second channel property. The method further comprises switching 700 between the first mode of operation and the second mode of operation, so as to alternately communicate, using the mesh network bridging device, with the resource restricted device and the mesh network to thereby connect the resource restricted device to the mesh network.

Optionally, the method further comprises generating 710, using the mesh network bridging device, first update data based on the second channel property; passing 720, using the mesh network bridging device, the first update data to the resource restricted device; and adjusting 730 the first channel property of the first communication channel based on the first update data.

The method may further comprise communicating 430, in a third mode of operation of the mesh network bridging device, with the resource restricted device and the mesh network over a single communication channel.

The method comprises determining 740, using the mesh network bridging device, whether the second channel property (associated with the mesh network) is different to the first channel property (associated with the resource restricted device).

The method optionally further comprises determining, using the mesh network bridging device, whether a channel property of the communication channel of the mesh network is to be changed, so as to determine whether to switch the mesh network bridging device from the third mode of operation into the first and/or second mode of operation.

In at least one embodiment, there is provided a computer program product comprising computer program code means adapted to perform all of the steps of the method as described with reference to FIG. 7 when said program is run on a computing device having a processor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mesh network bridging device for connecting a resource restricted device to a mesh network, the resource restricted device communicating in a first communication channel having a first channel property and the mesh network communicating in a second communication channel having a second channel property, the mesh network bridging device being adapted to have:
    a first mode of operation, wherein the mesh network bridging device receives a communication from the resource restricted device along the first communication channel having the first channel property;
    a second mode of operation, wherein the mesh network bridging device communicates with the mesh network along the second communication channel having the second channel property; and
    a third mode of operation in which the mesh network bridging device communicates with both the mesh network and the resource restricted device over a single communication channel,
    wherein the mesh network bridging device is adapted to:
    determine if the first channel property of the first communication channel is different to the second channel property of the second communication channel; and
    in response to the first channel property being different to the second channel property, switch between the first mode of operation and the second mode of operation thereby allowing the resource restricted device to connect to the mesh network via the mesh network bridging device, and
    in response to the first channel property being the same as the second channel property, the mesh network device operates in the third mode of operation.

2. The mesh network bridging device of claim 1, wherein the first channel property and the second channel property each comprise a same at least one of the following:

a channel frequency;
a channel encoding scheme;
a channel phase;
an electromagnetic polarization; and
an electromagnetic orbital angular momentum;
a voltage;
a current;
a communication protocol at a particular level of an OSI stack model;
a level of security;
an encryption key;
a security algorithm; and
usage of a security service.

3. The mesh network bridging device of claim 1 adapted to:
receive first update information from the mesh network; and
adjust the second channel property based upon the first update information.

4. The mesh network bridging device of claim 1 adapted to:
incrementally or strategically adjust the second channel property until connection to the mesh network is established.

5. The mesh network bridging device of claim 1 adapted to:
generate second update data based upon the second channel property;
transmit the second update data to the resource restricted device; and
adjust the first channel property based upon the second update information.

6. The mesh network bridging device of claim 1 adapted to periodically switch between the first mode of operation and the second mode of operation, and optionally wherein the mesh network bridging device is further adapted to determine the switching period between the first mode of operation and the second mode of operation based a communication property of the resource restricted device.

7. The mesh network bridging device of claim 6 wherein the periodically switch feature comprises periodically switching back to the first node thereby enabling the network bridging device to alternatively listen on the first and second communication channel.

8. A mesh network comprising:
a mesh network bridging device according to claim 1;
a parent node adapted to communicate with the mesh network bridging device along the second communication channel, wherein the mesh network bridging device is adapted to only communicate with the mesh network via the parent node.

9. The mesh network of claim 8, wherein the parent node is adapted to buffer data for transmitting to the mesh network bridging device when the mesh network bridging device is in the first mode of operation.

10. The mesh network of claim 8, wherein:
the mesh network is a wireless network operating in accordance with the ZigBee® standard;
the mesh network bridging device is a green power infrastructure device;
the resource restricted device is a green power device; and
the parent node is a ZigBee® router node.

11. A method of connecting a resource restricted device to a mesh network, the resource restricted device communicating in a communication channel having a first channel property and the mesh network communicating in a communication channel having a second channel property, the method comprising:
during a first mode of operation, a mesh network bridging device receiving a communication from the resource restricted device along the first communication channel having the first channel property;
during a second mode of operation, communicating, using the mesh network bridging device, with the mesh network along the second communication channel having the second channel property;
during a third mode of operation communicating, using the mesh network bridging device, with both the mesh network and the resource restricted device over a single communication channel;
determining if the first channel property of the first communication channel is different to the second channel property of the second communication channel;
in response to the first channel property being different to the second channel property, switching between the first mode of operation and the second mode of operation; and
in response to the first channel property being the same as the second channel property, operating in the third mode of operation.

12. The method of claim 11 further comprising:
receiving, at the mesh network bridging device, first update information from the mesh network; and
adjusting the second channel property based upon the first update information.

13. The method of claim 11 further comprising:
incrementally or strategically adjusting the second channel property until connection to the mesh network is established.

14. The method of claim 11 further comprising:
generating, using the mesh network bridging device, second update data based upon the second channel property;
transmitting, using the mesh network bridging device, second update data to the resource restricted device; and
adjusting the first channel property based upon the second update information.

15. A non-transitory computer readable medium containing computer instructions stored therein for causing a computer process to perform the steps of the method according to claim 11.

16. A mesh network bridging device for connecting a resource restricted device to a mesh network, the resource restricted device communicating in a first communication channel having a first channel property and the mesh network communicating in a second communication channel having a second channel property, the mesh network bridging device being adapted to have:
a first mode of operation, wherein the mesh network bridging device communicates with the resource restricted device along the first communication channel having the first channel property;
a second mode of operation, wherein the mesh network bridging device communicates with the mesh network along the second communication channel having the second channel property; and
a third mode of operation in which the mesh network bridging device communicates with both the mesh network and the resource restricted device over a single communication channel, wherein the mesh network bridging device can only communicate along a single communication channel, either the first communication channel or the second communication channel, at any given time, and is adapted to:

determine if the first channel property of the first communication channel is different to the second channel property of the second communication channel; and in response to the first channel property being different to the second channel property, switch periodically between the first mode of operation and the second mode of operation to alternately communicate on the first communication channel and the second communication channel thereby allowing the resource restricted device to connect to the mesh network via the mesh network bridging device, and in response to the first channel property being the same as the second channel property, the mesh network bridging device operates in the third mode of operation.

\* \* \* \* \*